United States Patent [19]

Suderman

[11] 4,419,371

[45] Dec. 6, 1983

[54] PACKAGED TOPPING FOR SALADS AND THE LIKE

[75] Inventor: Darrel R. Suderman, Middleburg Heights, Ohio

[73] Assignee: SCM Corporation, New York, N.Y.

[21] Appl. No.: 357,507

[22] Filed: Mar. 12, 1982

[51] Int. Cl.$^3$ .................. A23L 1/176; A23L 1/226; A23L 1/22

[52] U.S. Cl. .................................. 426/94; 426/96; 426/102; 426/289; 426/555; 426/560; 426/638; 426/650

[58] Field of Search ............... 426/96, 94, 555, 102, 426/638, 650, 289, 292, 589, 808, 560

[56] References Cited

U.S. PATENT DOCUMENTS

| | | | |
|---|---|---|---|
| 3,449,132 | 6/1969 | Luksas | 426/555 |
| 3,769,038 | 10/1973 | Mitchell | 426/638 |
| 3,814,825 | 6/1974 | Gilmartin | 426/650 |
| 3,851,072 | 11/1974 | Huessy | 426/650 |
| 3,870,803 | 3/1975 | Siems | 426/555 |
| 3,971,859 | 7/1976 | Huessy | 426/650 |
| 3,976,798 | 8/1976 | Young et al. | 426/291 |

Primary Examiner—Jeanette M. Hunter
Attorney, Agent, or Firm—Richard H. Thomas

[57] ABSTRACT

The present invention constitutes an improved, packaged, non-frozen topping capable of storage at ambient temperature, and immediate use after storage, comprising broadly a plurality of edible deep-fat fried, batter-coated fibrous vegetable pieces and blended therewith an effective amount of edible, crisp, cellular, farinaceous pieces sufficient for rendering the topping resistant to clumping, said topping being readily pourable from the container therefor.

9 Claims, No Drawings

PACKAGED TOPPING FOR SALADS AND THE LIKE

The present invention relates to a novel packaged topping containing batter-fried vegetable pieces, such as batter fried onion pieces. The invention will be described with respect to a topping suitable for dispensing onto salads, but it will be apparent to those skilled in the art that the present invention has other applications, for instance a topping suitable for dispensing onto potatoes, eggs, casseroles and stuffing.

BACKGROUND OF THE PRESENT INVENTION

Salad toppings of diverse components are well known. For instance, it is quite common to find in restaurants today a salad bar which will offer numerous toppings such as tomato pieces, cucumber slices, onion rings, croutons, bacon bits, cheese bits, and the like. These diverse components are arranged in separate containers and the customer very easily selects from the multiple containers to make up a salad topping of choice. However, the luxury of such a selection is unique to restaurants and not generally available for normal consumption at home.

Packaged batter-coated and then deep-fat fried vegetable pieces such as onion rings or pieces are known, for instance those marketed by SCM Corporation under the trademark Durkee O & C French Fried Onions. The same are sold as a topping for casseroles, green beans and the like, and are readily pourable from their container. This is because they are immediately packaged following frying and are not subject to moisture pick-up from the environment.

However, if the batter-coated and fried onion pieces are to be combined with other ingredients, for instance textured vegetable proteins such as imitation bacon bits, to make up a package of diverse components, they have to be blended with the other ingredients prior to packaging. This allows the onion pieces to be exposed to atmospheric conditions for a sufficient time to pick up moisture, the moisture and high oil content of the pieces giving them a tendency to adhere or stick together. Particularly in pouring from a container, they have a tendency to pour as clumps of particles. This adherence tendency increases with high storage temperatures, for instance about 86° F. Ingredients are known and marketed as anti-caking compounds, for instance Zeofree 80, marketed by Huber Company. Such ingredients have not been found to be successful in preventing clumping of deep-fat fried, batter-coated products, particularly during dispensing or pouring from a container. Also, such ingredients may not necessarily be organoleptically compatible or complementary with batter coated and fried onion or other vegetable pieces.

U.S. Pat. No. 3,976,798 to Young et al, describes packaged, breaded vegetable product such as onion rings, wherein the coating of the breaded ring is set quickly, as by flash frying, and then frozen. It is reconstituted by frying prior to use. The breading is provided in two layers; an interior layer of viscous batter with fine mesh breading, and an outer layer of relatively less viscous batter with relatively course mesh breading. The breading is an integral part of the onion ring or vegetable product.

BRIEF DESCRIPTION OF THE PRESENT INVENTION

The present invention constitutes an improved, packaged, non-frozen topping capable of storage at ambient temperature, and immediate use after storage, comprising broadly a plurality of edible deep-fat fried, batter-coated fibrous vegetable pieces and blended therewith an effective amount of edible, crisp, cellular, farinaceous pieces sufficient for rendering the topping resistant to clumping, said topping being readily pourable from the container therefor.

More specifically, as a preferred embodiment, the present invention comprises, about 65–80% of a plurality of onion pieces which are each dusted with flour, coated with batter, and deep-fat fried and dried to approximately 3% total moisture, the onion pieces having a crisp, cellular structure; and about 5–20% of a plurality of crouton pieces discreet from the onion pieces and also having a crisp, cellular structure, said onion pieces and crouton pieces being packaged in a suitable container, said crouton pieces being present in a non-clumping amount sufficient to prevent clumping of the topping during dispensing from said container.

In a further preferred embodiment of the present invention, the topping also comprises a flavoring amount of condiment pieces selected from the group consisting of imitation bacon bits, imitation cheese bits, and imitation pepperoni bits.

DETAILED DESCRIPTION OF THE PRESENT INVENTION

The batter-coated vegetable pieces of the present invention broadly can be any hydrocellular, fibrous vegetable which cooks to a non-mealy, crisp, cellular base when fat fried. Included, in addition to onion pieces, are such vegetable pieces as carrots, parsnips, turnips, radishes, peppers, melon rind, cucumbers, celery, zucchini and other squash particulate. However, the present invention is particularly applicable to the use of batter coated, deep-fat fried onion pieces.

For purposes of the present invention, the term "batter-coated" means conventional batter coatings and also coatings sometimes referred to as "breaded coatings", in which one of the process breadings, of which there are many on the market, has been added to give additional crispness and body. A batter coating comprises a liquid mixture of water, flour, starch, and seasonings into which food products are dipped prior to frying. In the publication "Use of Batters and Breadings On Food Products—A Review" by F. E. Cunningham and D. E. Suderman, presented at the Spelderholt Symposia on 17–23, May, 1981, Apeldoorn, The Netherlands, a batter mix is described as having 80–90% starch and flour, dry basis, and is combined with water on a 1.5 to 2 to 1 basis. A coating to which a breading has been added, on the other hand, may have a coarser texture. A breading will contain only a 70–80% flour and starch combination, somewhat less than the conventional batter mixes. An example of a suitable process breading is one marketed by The Newlywed Foods of Chicago, Ill. The particle size of the breading is not critical, and a variety of particle sizes or particle size distributions can be employed.

Any of the conventional deep-fat frying procedures can be employed in the practice of the present invention. Generally, the deep frying fat will be at a temperature in the range of about 370°–390° F., and the products will be cooked in such fat for about 20-30 seconds, up to 3-4 minutes, or until golden brown in color. Preferably, the onion ring pieces or other vegetable pieces are turned over once or twice during cooking to ensure uniformity in cooking and color. Following cooking, they are dried for a prolonged period to about 3% moisture content.

Thus, the vegetable pieces should be of such character that when so cooked, they develop a crisp or crunchy structure. A crisp or crunchy structure is characterized as one having a rigid, non-deformable, stiff texture that suddenly collapses with a brittle fracture and a rapid decay of force after fracture. It has very low shear strength and breaks up under simple compression between the teeth with little or no grinding or tearing, rapidly breaking down into small pieces. (Journal of Food Science, Vol. 41, 1976, pages 1153, 1154). The crispiness or crunchiness of the onion or other vegetable pieces is important because such texture is generally associated with or is synonymous with freshness, in the mind of the consumer.

In this regard, the composition of the batter should also provide a crisp structure to contribute to the pleasure of eating, in addition to enhancing the appearance and taste of the topping. During the batter blending step, the multiple components of the batter interact to form a film structure capable of entraping air, thus forming an air cell. The air for the cell is partially supplied by mechanically mixing the batter. These same air cells are expanded and new ones formed as the batter is fried. Frying is a dehydration process that causes the moisture in the product to convert to water vapor. Some escaping water vapor is trapped in the batter, forming additional cells or expanding existing air cells. These cell walls are dehydrated during frying and create a unique crispness.

The size of the vegetable pieces is critical in the sense that they should be large enough to give the crispness response when chewed. That is, they should be large enough to be grasped firmly with the teeth and chewed into small bits which are swallowed with ease. They should not be so large as to make chewing difficult, or to affect the crispness sensation. Generally, such vegetable pieces will be about thumbnail size.

Preparation of the vegetable pieces is not critical; it can be carried out by slicing, dicing, or cutting into strips or chips. Onion slices or rings which are cut are preferred.

The farinaceous pieces of the present invention can be broadly any farinaceous piece which is cellular in structure and crunchy or brittle. For instance, toast pieces can be employed or cracker pieces that have a complementary taste and texture. Preferred pieces, in accordance with the concepts of the present invention, are crouton pieces, which were found to have complementary crunchiness and particle size complementing the onion pieces. In this regard, the croutons are composed of a plurality of air-developed cells, which are a product of yeast and/or chemical leavening. The crispness of this product is different from that of the batter-fried onions because the ingredient composition is different. However, the crispness was found to be complementary. Also within the scope of the present invention would be bread stick pieces or pretzel stick pieces.

Broadly, any food product which has a rigid, non-deformable, stiff structure that suddenly collapses with a brittle fracture and rapid decay, can be employed. For instance, crouton pieces have a chewing pattern that exhibits a steep initial slope in a force-compression curve, indicating substantial rigidity and resistance to deformation. This, however, is followed by a rapid decrease in force after the first break, indicating brittle fracture of the whole piece. The series of smaller peaks in a force-compression curve indicate successive brittle fractures of smaller pieces as the food is further compressed. Farinaceous products which exhibit these characteristics are within the scope of the present invention (Malcolm C. Bourne, "Fabricated Foods", Chapter 11, pages 148, 149).

A principal function of the farinaceous pieces that are used is to control or prevent clumping. The success of such pieces in the product of the present invention is attributable to the physical disruption or dispersion of the batter-fried onion pieces when packaged. The farinaceous pieces also function as a "sponge" in stabilizing the micro-environment within the container. Since they are extremely dry and porous, they have an ability to absorb moisture and/or oil to maintain an acceptable equilibrium between these two materials, while acting as a physical dispersing agent.

Although, broadly, about 5-20% crouton pieces can be employed, it was found that about 15% croutons provided an optimum crispness profile in addition to optimum appearance, taste, and shelf stability.

A wide range of additional ingredients can be employed in accordance with the concepts of the present invention, for instance, textured vegetable protein such as imitation bacon bits. In addition, imitation cheese bits or imitation pepperoni bits, both prepared from textured vegetable proteins and suitable flavorants and colorants, can be employed. All of such bits should be sized and selected to complement the onion rings and croutons. Preferably, the sizing of the bacon bits or other flavoring bits should be slightly less that that of the crouton pieces which, in turn, should be slightly smaller in size than the onion pieces. By having the batter-fried onion pieces slightly larger than the crouton pieces, the texture profile for the product is enhanced, due to the fact that it would take more bites and longer mastication for the batter-fried onion pieces than for the smaller ingredients.

Seasonings such as cheese, garlic, or onion can be lightly applied or coated to any or all of the main components of the product of the present invention.

Preparation of the products of the present invention can be carried out in a large number of ways. In a preferred example, the product is produced by blending the ingredients in a Patterson-Kelley blender, for a minimal length of time (about 2½ minutes) to prevent product breakage. By way of example, the particle size distribution may be

| Percent Retained | Sieve Size (U.S. Standard Sieve) |
|---|---|
| 70% ± 5% | On a No. 4 |
| 20% ± 5% | On a No. 8 |
| 10% or less | Through a No. 8 |

The product is considered preferred if less than 10% of the product passes through a U.S. Standard Sieve No. 8. In addition to minimizing breakage, the 2½ minute blend time was also found to be optimum for seasoning distribution and adhesion. After blending, the product is filled into composite containers with any suitable filler, e.g., a Solbern filler, labeled and stored at warehouse temperatures at or below 75° F. prior to distribution for consumption.

The following formulation was employed, by way of example

TABLE I
TOPPING CONDIMENT COMPOSITION

| Ingredient | Percent (range) |
| --- | --- |
| Batter-fried onions | 65–80% |
| Croutons | 5–20% |
| Imitation chopped bacon, pepperoni or cheddar cheese bits | 5–15% |
| Seasoning blend | 5–10% |

When used on a salad as a topping, the product exhibited a pleasing crisp or crunchy sensation, with excellent flavor development. No clumping of product was ascertained as the product was dispensed onto a salad from its container.

What is claimed is:

1. An improved, packaged, non-frozen topping capable of storage at ambient temperature, and immediate use after storage, comprising
   a plurality of edible deep-fat fried, batter-coated fibrous vegetable pieces, said vegetable pieces being of the type which cook to a non-mealy crisp cellular structure when deep fat fried; and blended therewith
   an effective amount of edible, crisp, cellular, farinaceous pieces effectively interspersed with the vegetable pieces for rendering the topping resistant to clumping;
   said topping being readily pourable from the container therefor.

2. The topping of claim 1 wherein said vegetable pieces are onion pieces.

3. The topping of claim 2 wherein said farinaceous pieces are croutons.

4. The topping of claim 3 further comprising flavored, imitation, textured vegetable pieces.

5. The topping of claim 4 having the following particle size distribution:

| Percent Retained | Sieve Size (U.S. Standard Sieve) |
| --- | --- |
| 70% ± 5% | On a No. 4 |
| 20% ± 5% | On a No. 8 |
| 10% or less | Through a No. 8 |

6. The topping of claim 5 comprising on a weight basis, about 65–80% onion pieces, about 5–20% crouton pieces, and about 5–15% imitation, textured vegetable pieces.

7. An improved, packaged, non-frozen topping capable of storage at ambient temperature, and immediate use after storage, comprising, on a weight basis:
   about 65–80% of a plurality of onion pieces which are each dusted with flour, coated with batter, and deep-fat fried to approximately 3% total moisture, the onion pieces having a crisp, cellular structure; and
   about 5–20% of a plurality of crouton pieces discreet from the onion pieces and also having a crisp, cellular structure, said onion pieces and crouton pieces being packaged in a suitable container;
   said crouton pieces being present in a non-clumping amount effectively interspersed with the onion pieces sufficient to prevent clumping of the topping during dispensing from said container.

8. The topping of claim 7 further comprising about 5–15% of flavored, imitation, textured vegetable pieces.

9. The topping of claim 8 having the following particle size distribution;

| Percent Retained | Sieve Size (U.S. Standard Sieve) |
| --- | --- |
| 70% ± 5% | On a No. 4 |
| 20% ± 5% | On a No. 8 |
| 10% or less | Through a No. 8 |

* * * * *